United States Patent
Reimer

[11] 3,905,194
[45] Sept. 16, 1975

[54] HYDROSTATIC TRANSMISSION

[75] Inventor: Leonard H. Reimer, Hutchinson, Kans.

[73] Assignee: The Cessna Aircraft Company, Hutchinson, Kans.

[22] Filed: Sept. 4, 1973

[21] Appl. No.: 394,383

[52] U.S. Cl. .................. 60/449; 417/199; 417/222
[51] Int. Cl.² ..................... F16D 31/02; F04B 1/26
[58] Field of Search ............ 60/445, 447, 449, 444, 60/446, 450; 91/400, 401, 506, 52; 251/205, 325; 417/212, 218, 222, 199

[56] References Cited
UNITED STATES PATENTS

| | | | |
|---|---|---|---|
| 328,730 | 10/1885 | Thoens | 91/401 |
| 2,011,333 | 8/1935 | Clifton | 137/538 |
| 2,472,477 | 6/1949 | Harrington et al. | 60/450 |
| 2,571,758 | 10/1951 | Purcell | 417/213 |
| 3,067,693 | 12/1962 | Lambeck | 417/218 |
| 3,238,724 | 3/1966 | Miller | 60/444 |
| 3,543,508 | 12/1970 | Schwab | 60/449 |
| 3,579,988 | 5/1971 | Firth | 60/449 X |
| 3,588,285 | 6/1971 | Moon, Jr. | 417/202 |
| 3,679,327 | 7/1972 | Riedhammer | 417/222 |
| 3,784,328 | 1/1974 | Pedersen | 417/222 |
| 3,788,774 | 1/1974 | Roesslein | 417/218 |

*Primary Examiner*—Irwin C. Cohen
*Assistant Examiner*—Edward Look

[57] ABSTRACT

An axial piston, servo controlled variable displacement pump is coupled to the engine shaft and the pump's displacement is controlled by the speed of the engine through a small fixed displacement pump driven by the shaft. The small pump's output pressure causes the servo piston to increase the main pump's displacement. A spring restrains the servo piston from moving the main pump off neutral position until idling speed is exceeded. The servo piston has a tapered groove which permits passage of greater volumes of fluid to reservoir as pressure rises. A modification provides another cylinder which opposes the increase in displacement when there is high pressure in the main pump's output thereby improving the drive ratio under heavy load conditions.

5 Claims, 2 Drawing Figures

HYDROSTATIC TRANSMISSION

BACKGROUND OF THE INVENTION

This invention is in the field of hydrostatic transmissions which provide a connection between a prime mover, such as an internal combustion engine, and a load such as a vehicle drive shaft.

U.S. Pat. No. 3,384,019, Ifield, describes a way of controlling torque which bears relationship with this invention. The Ifield patent and others in this field are more complex devices than the one described herein and operate in a different manner.

BRIEF SUMMARY OF THE INVENTION

It is an object of this invention to provide a simple hydrostatic transmission that closely resembles, in operation, an automotive automatic transmission and can be applied to a wide field of machines and vehicles.

It is another object of this invention to use a well developed mechanism, the variable displacement pump, as a basic element of an automatic transmission.

The invention combines a variable displacement pump, automatic controls to regulate the displacement, and a hydrostatic motor to provide a smooth transfer of power from a prime mover, such as an internal combustion engine, to a driven load such as a vehicle or a machine. The automatic control is a positioning cylinder to move the swash plate of the pump to greater displacement as speed of the engine increases, the activating force being a small fixed displacement pump mounted on the main pump's shaft which is coupled with the engine shaft. The piston in the cylinder has a tapered groove serving to increase the area of the vent as the swash plate moves toward greater displacement. The tapered groove can be sized and shaped to produce the desired operating characteristics. A biasing means holds the swash plate in neutral position at engine idling speed. A modification of the invention adds a subordinate cylinder, responsive to the output pressure of the main pump and opposed to the positioning cylinder, which reduces the amount of displacement under heavy load conditions thereby increasing the drive ratio and performance.

BRIEF DESCRIPTION OF THE DRAWINGS

Other objects and advantages of the invention will become apparent upon reading the following detailed description and upon reference to the following drawings, in which.

DETAILED DESCRIPTION OF THE INVENTION

While the invention will be described in connection with a preferred embodiment, it will be understood that it is not intended to limit the invention to that embodiment. On the contrary, it is intended to cover all alternatives, modifications, and equivalents within the spirit and scope of the invention as defined by the appended claims.

Figure 1:
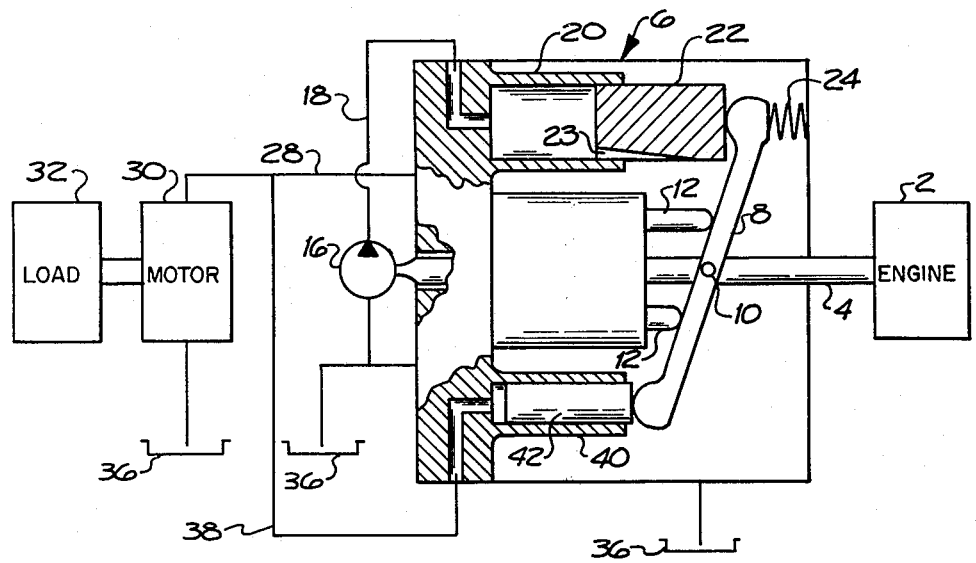
FIG. 1 is a view partially of a central longitudinal section and partially of a symbolic circuit.

Turning to FIG. 1, a source of power 2 is a prime mover, for example an internal combustion engine, which drives, through a shaft 4, a main pump 6 which is a variable displacement pump, well known in the art, the pertinent parts of which are shown in the drawing. A swash plate 8 pivots on a pintle 10 as influenced by a positioning cylinder 20 with a piston 22, an auxiliary subordinate cylinder 40 with a piston 42 and a biasing spring 24. Pistons 12 of main pump 6 are adjusted in stroke by the position of the swash plate 8 from a position of zero stroke and displacement, when the swash plate 8 is normal to the shaft 4, to maximum stroke and displacement when the positioning piston 22 is fully extended and the auxiliary piston 42 is fully retracted, as illustrated in the drawing. The positioning piston 22 has a tapered longitudinal groove 23 which vents fluid to a reservoir 36 having maximum vent opening when the swash plate 8 is at maximum displacement position. A small fixed displacement pump 16 is driven by the shaft 4, its output is thus coordinated with the speed of the main pump 6, and delivers its output through a conduit 18 to cylinder 20. A conduit 28 conducts the output of the main pump 6 to a motor 30 which can be an axial piston type with a fixed or variable displacement, in the latter case it may include a swash plate reversing means. The motor 30 drives a load 32. Discharge from the motor 30 goes to the reservoir 36. Supply lines for the main pump 6 and the small pump 16 draw from the reservoir 36.

Figure 2:
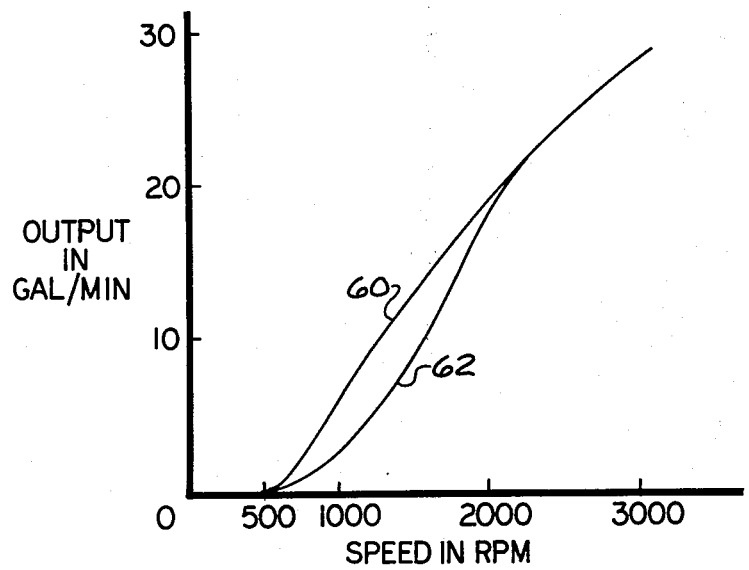
FIG. 2 is a graph showing a typical output of the main pump at various speeds.

The mode of operation gives results closely resembling the automatic transmission of an automobile. Turning attention to FIG. 2 as well as FIG. 1, the source of power 2 can typically be an internal combustion engine. When engine 2 is started and while it is running at idling speed, the biasing spring 24 holds swash plate 8 normal to shaft 4 so that main pump 6 delivers no output. FIG. 2, a graph showing output volume in relation to speed of a typical main pump 6, shows no output until speed of main pump 6 reaches 500 RPM. During this idling range small pump 16 is delivering fluid to cylinder 20 and venting it through the smallest opening of tapered groove 23 and the force on piston 22 is not great enough to overcome force of biasing spring 24. Assuming the load 32 is the driveshaft of a vehicle, as the operator steps on the throttle of engine 2, the vehicle starts moving and as the speed increases the pump will continue to increase in stroke under the influence of output pressure of small pump 16 on piston 22 until full stroke or the desired vehicle speed is reached. Main pump 6 will reach full stroke at, say, half full engine speed. To stop, the operator releases the throttle, the engine 2 and the main pump 6 return to idle speed and the vehicle coasts to a stop. The output of the just described cycle is shown on curve 60 of FIG. 2, its upper limit depending upon the maximum power applied by engine 2. Characteristics of the transmission can be tailored to fit desired performance by sizing and shaping the tapered groove 23 of piston 22. The groove 23 could be in the wall of cylinder 20 or in both cylinder 20 and piston 22 when desirable.

Reversal of this drive could be done with a directional control valve or by reversing the swash plate on motor 30.

A modification of the invention comprises the addition of an auxiliary subordinate cylinder 40 with a piston 42 acting upon the swash plate 8 in the reverse maner from piston 22. The pressure acting upon the piston 42 is that of the output of main pump 6 in the conduit 28 conducted to cylinder 40 by a conduit 38. Piston 42 is sized significantly smaller than piston 22 so that piston 22 remains dominant in adjusting the displacement but its influence is tempered by piston 42 under heavy load conditions since these conditions increase pressure in conduit 38. This tempering of the effect of piston 22 results in reducing displacement of main pump 6 thus increasing the drive ratio and power delivered to motor 30 and load 32. Operating characteristics of adding cylinder 40 are shown in FIG. 2 by the line 62. If the operator applies the throttle in a manner to increase acceleration or to accommodate a heavy pull, the output curve is typically shown in curve 62 in FIG. 2. The return curve upon release of throttle would follow curve 60 as in normal throttle applications. Instead of using cylinder 40, the pintle 10 of swash plate 8 could be moved slightly above center or the valve ports in the pump could be slightly above center or the valve ports in the pump could be slightly advanced in the direction of rotation, both familiar methods in the art to achieve biasing toward less displacement as a function of output pressure.

Another modification which could be used where the operating characteristics are not too particular, is to give up the advantages of the tailored-to-shape tapered groove 23 and use a fixed orifice bleeding off conduit 18. Such a device would not be adjustable to a desired speed-output curve but would be limited to the curve determined by a fixed orifice.

Thus it is apparent that there has been provided, in accordance with the invention, a specification for a hydrostatic transmission that fully satisfies the objects, aims and advantages set forth above.

Having described the invention with sufficient clarity to enable those familiar with the art to construct and use it, I claim:

1. A hydrostatic transmission for use between a prime mover and a load, comprising:
   a. a variable displacement pump having a swash plate and a swash plate positioning cylinder connected thereto;
   b. a small fixed displacement pump mechanically driven by the variable displacement pump;
   c. a control piston in the positioning cylinder responsive to the output pressure of the fixed displacement pump;
   d. a generally narrow tapered longitudinal groove means in the periphery of the control piston defining a bleed area and continuously venting the cylinder to reservoir, the groove means enlarging the bleed area as the swash plate tilts to increase displacement of the variable displacement pump;
   e. a biasing means urging the swash plate toward a decreased displacement position; and
   f. a fluid motor driven by the output from the variable displacement pump.

2. A transmission as recited in claim 1 in which the biasing means comprises a spring.

3. A transmission as recited in claim 1 further comprising an auxiliary subordinate control cylinder means connected to the swash plate, said means opposing the force exerted by the swash plate positioning cylinder, responsive to the output pressure of the variable displacement pump.

4. A variable displacement pump compensated for speed comprising:
   a. a variable displacement pump having a swash plate and a swash plate positioning cylinder connected thereto;
   b. a small fixed displacement pump mechanically driven by the variable displacement pump;
   c. a control piston in the positioning cylinder responsive to the output pressure of the fixed displacement pump;
   d. a generally narrow tapered longitudinal groove means in the periphery of the control piston defining a bleed area and continuously venting the cylinder to reservoir, the groove means enlarging the bleed area as the swash plate tilts to increase displacement of the variable displacement pump; and
   e. a biasing means urging the swash plate toward a decreased displacement position.

5. A pump as recited in claim 4 further comprising an auxiliary subordinate control cylinder means connected to the swash plate, said means opposing the force exerted by the swash plate positioning cylinder, responsive to the output pressure of the variable displacement pump.

* * * * *